(12) United States Patent
Shao et al.

(10) Patent No.: US 10,824,419 B2
(45) Date of Patent: *Nov. 3, 2020

(54) FUNCTION-AS-A-SERVICE (FAAS) PLATFORM IN BLOCKCHAIN NETWORKS

(71) Applicant: Alibaba Group Holding Limited, George Town (KY)

(72) Inventors: Kailai Shao, Hangzhou (CN); Xuming Lu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,559

(22) Filed: Mar. 30, 2020

(65) Prior Publication Data

US 2020/0225937 A1  Jul. 16, 2020

Related U.S. Application Data

(63) Continuation of application No. 16/390,088, filed on Apr. 22, 2019, which is a continuation of application No. PCT/CN2018/117637, filed on Nov. 27, 2018.

(51) Int. Cl.
G06F 8/70 (2018.01)
H04L 9/32 (2006.01)
G06F 9/46 (2006.01)

(52) U.S. Cl.
CPC ............... *G06F 8/70* (2013.01); *G06F 9/46* (2013.01); *H04L 9/3239* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| 10,095,888 B1 | 10/2018 | Lee et al. |
| 2002/0152455 A1 | 10/2002 | Hundt et al. |
| 2009/0265355 A1 | 10/2009 | Chen et al. |
| 2017/0140408 A1 | 5/2017 | Wuehler |
| 2017/0187838 A1 | 6/2017 | Sankaranarasimhan et al. |

(Continued)

FOREIGN PATENT DOCUMENTS

| CN | 106603698 | 4/2017 |
| CN | 108717466 | 10/2018 |

(Continued)

OTHER PUBLICATIONS

Chen et al., "FBaaS: Functional Blockchain as a Service," International Conference on Financial Cryptography and Data Security, Springer International Publishing, 2018, XP047476586, 8 pages.

(Continued)

*Primary Examiner* — Qing Chen
(74) *Attorney, Agent, or Firm* — Fish & Richardson P.C.

(57) ABSTRACT

Implementations of the present specification include receiving, from a smart contract, and by a function controller executing within the blockchain network, a function call to execute a function, the function call including data for execution of the function, transmitting, by the function controller, the data of the function call to a function component, the function component executing the function based on the data of the function call, receiving, by the function controller, a function result from the function component, and providing, by the function controller, the function result to the smart contract.

21 Claims, 5 Drawing Sheets

(56) References Cited

U.S. PATENT DOCUMENTS

| | | |
|---|---|---|
| 2018/0198630 A1 | 7/2018 | Androulaki et al. |
| 2018/0331835 A1 | 11/2018 | Jackson |
| 2019/0042315 A1 | 2/2019 | Smith et al. |
| 2019/0116185 A1 | 4/2019 | Nagai et al. |
| 2019/0244294 A1 | 8/2019 | Shao et al. |

FOREIGN PATENT DOCUMENTS

| | | |
|---|---|---|
| JP | 2015156526 | 8/2015 |
| JP | 2019530109 | 10/2019 |
| KR | 20180095912 | 8/2018 |
| RU | 2658784 | 6/2018 |
| WO | WO 2017070575 | 4/2017 |
| WO | WO 2018039722 | 3/2018 |
| WO | WO 2018051305 | 3/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

European Extended Search Report in European Patent Application No. 18865365.3, dated Jan. 3, 2020, 9 pages.

Fromm, "How blockchain and serverless provessing fit together to impcact the next wave," May 2017, [Retreived on Dec. 26, 2019], retrieved from: UR:<https://read.acloud.guru/blockchain-and-serverless-processing-similarities-differences-and-how-they-fit-together-c12142373287>, 16 pages.

International Search Report and Written Opinion in International Application No. PCT/CN2018/117637, dated Aug. 28, 2019, 6 pages.

Nakamoto, "Bitcoin: A Peer-to-Peer Electronic Cash System," www.bitcoin.org, 2005, 9 pages.

Searchcompliance.techtarget.com [online], "smart contract," Apr. 2018, retrieved on Jul. 2019, retrieved from <https://searchcompliance.techtarget.corn/definition/smart-contract>, 7 pages.

Web.archive.org [online], "Oraclize Documentation," available on or before Nov. 7, 2018, via Internet Archive: Wayback Machine URL <https://web.archive.org/web/20181107044842/https://docs.oraclize.it/>, [Retrieved on Dec. 13, 2019], retrieved from: URL<https://docs.oraclize.it/>, 41 pages.

Wohrer et al "Design Patterns for Smart Contracts in the Ethereum Ecosystem", in 11th IEEE International Conference on Internet of Things (iThings-2018) Halifax, Canada, Jul. 30-Aug. 3, 2017, 8 pages.

FUNCTION-AS-A-SERVICE (FAAS) PLATFORM IN BLOCKCHAIN NETWORKS

CROSS-REFERENCE TO RELATED APPLICATIONS

This application is a continuation of U.S. patent application Ser. No. 16/390,088 (now U.S. Pat. No. 10,671,380), filed on Apr. 22, 2019, which is a continuation of PCT Application No. PCT/CN2018/117637, filed on Nov. 27, 2018, each application is hereby incorporated by reference in its entirety.

This application is a continuation of U.S. patent application Ser. No. 16/390,088, filed on Apr. 22, 2019, which is a continuation of PCT Application No. PCT/CN2018/117637, filed on Nov. 27, 2018, each application is hereby incorporated by reference in its entirety.

BACKGROUND

Distributed ledger systems (DLSs), which can also be referred to as consensus networks and/or blockchain networks, enable participating entities to securely and immutably store data. DLSs are commonly referred to as blockchain networks without referencing any particular use case (e.g., crypto-currencies). Example types of blockchain networks can include public blockchain networks, private blockchain networks, and consortium blockchain networks. A public blockchain network is open for all entities to use the DLS and participate in the consensus process. A private blockchain network is provided for a particular entity, which centrally controls read and write permissions. A consortium blockchain network is provided for a select group of entities, which control the consensus process, and includes an access control layer.

Smart contracts can execute within blockchain networks to perform one or more functions. A smart contract can be described as a monolithic application that includes coded functions. As a monolithic application, relatively robust development operations can be required to support the smart contract (e.g., coding of each function, updates to functions resulting in updates of the entire smart contract).

SUMMARY

Implementations of the present specification include computer-implemented methods for provisioning applications in blockchain networks. More particularly, implementations of the present specification are directed to a function-as-a-service (FaaS) platform to provision functions to applications executing in blockchain networks.

In some implementations, actions include receiving, from a smart contract, and by a first function controller executing within the blockchain network, a first function call to execute a first function, the first function call including data for execution of the first function, transmitting, by the first function controller, the data of the first function call to a first function component, the first function component executing the first function based on the data of the first function call, receiving, by the first function controller, a first function result from the first function component, and providing, by the first function controller, the first function result to the smart contract. Other implementations include corresponding systems, apparatus, and computer programs, configured to perform the actions of the methods, encoded on computer storage devices.

These and other implementations may each optionally include one or more of the following features: the first function call further includes an address of the first function and a version identifier of the first function; the version identifier is null indicating that a latest version of the first function is to be executed; actions further include updating, by the first function controller, statistics associated with a version of the first function that was executed in response to the first function call; the statistics indicate a number of times each version of a first function has been executed; actions further include: receiving, from a smart contract, and by a second function controller executing within the blockchain network, a second function call to execute a second function, the second function call including data for execution of the second function, wherein the second function is different from the first function, and wherein the second function controller is different from the first function controller, transmitting, by the second function controller, the data of the second function call to a second function component, the second function component executing the second function based on the data of the second function call, wherein the second function component is different from the first function component, receiving, by the second function controller, a second function result from the second function component, and providing, by the second function controller, the second function result to the smart contract; the first function and the second function are provided by different providers; and the smart contract executes a transaction at least partially based on the function results, the transaction being recorded within a blockchain of the blockchain network.

The present specification also provides one or more non-transitory computer-readable storage media coupled to one or more processors and having instructions stored thereon which, when executed by the one or more processors, cause the one or more processors to perform operations in accordance with implementations of the methods provided herein.

The present specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DESCRIPTION OF DRAWINGS

Like reference symbols in the various drawings indicate like elements.

DETAILED DESCRIPTION

Figure 1:
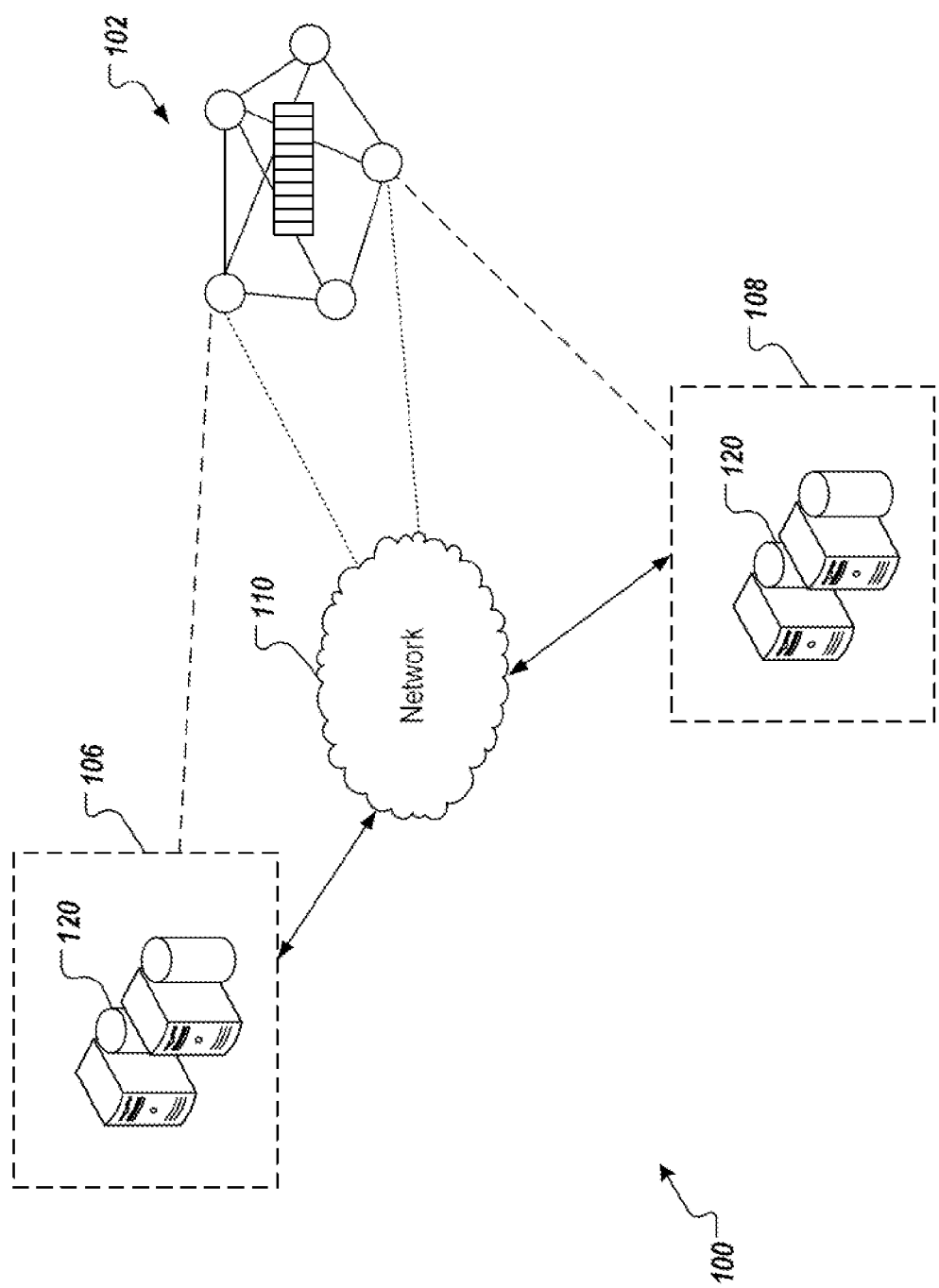
FIG. 1 depicts an example environment that can be used to execute implementations of the present specification.

Implementations of the present specification include computer-implemented methods for provisioning applications in blockchain networks. More particularly, implementations of the present specification are directed to a function-as-a-service (FaaS) platform to provision functions to applications executing in blockchain networks. In some implementations, actions include receiving, from a smart contract, and by a function controller executing within the blockchain network, a function call to execute a function, the function call including data for execution of the function, transmitting, by the function controller, the data of the function call to a function component, the function component executing the function based on the data of the function call, receiving, by the function controller, a function result from the function component, and providing, by the function controller, the function result to the smart contract.

To provide further context for implementations of the present specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate in a public blockchain network, each of which operates at least one node in the public blockchain network. Accordingly, the public blockchain network can be considered a public network with respect to the participating entities. In some examples, a majority of entities (nodes) must sign every block in order for the block to be valid and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network is provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid and added to the blockchain. In some examples, at least a sub-set of entities (nodes) (e.g., at least 7 entities) must sign every block in order for the block to be valid, and added to the blockchain.

Implementations of the present specification are described in further detail herein with reference to a public blockchain network, which is public among the participating entities. It is contemplated, however, that implementations of the present specification can be realized in any appropriate type of blockchain network. Although techniques described in the present specification are indicated as being relevant to public blockchain networks, the techniques can also be used, with or without changes, in other types of blockchain networks, including private blockchain networks, and consortium blockchain networks.

Implementations of the present specification are described in further detail herein in view of the above context. More particularly, and as introduced above, implementations of the present specification are directed to a FaaS platform to provision functions to applications executing in blockchain networks. In this manner, developers can develop applications (e.g., smart contracts) that are relatively light (e.g., in terms of coding), and can call one or more functions through the FaaS platform of the present specification.

To provide further context for implementations of the present specification, in blockchain networks, applications can be developed, tested, and deployed for execution within the blockchain network. An example application can include, without limitation, a smart contract. A smart contract can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network.

In some examples, a smart contract can store data, which can be used to record information, facts, associations, balances and any other information needed to implement logic for contract execution. Smart contracts can be described as a computer-executable program consisting of functions, where an instance of the smart contract can be created, and functions invoked for execution of the logic therein.

In technical terms, smart contracts can be implemented based on objects and object-oriented classes. For example, terms and components of the smart contract can be represented as objects that are handled by applications implementing the smart contracts. A smart contract (or an object in the smart contract) can call another smart contract (or an object in the same smart contract) just like other object-oriented objects. Calls that are made by an object can be, for example, a call to create, update, delete, propagate, or communicate with objects of another class. Calls between objects can be implemented as functions, methods, application programming interfaces (APIs), or other calling mechanisms. For example, a first object can call a function to create a second object.

An integrated development environment (IDE) can be used to develop, test, and deploy applications, such as smart contracts to blockchain networks. An example IDE includes the Remix IDE, provided by the Ethereum Foundation of Zug, Switzerland, for creating smart contracts in Solidity.

FIG. 1 depicts an example environment 100 that can be used to execute implementations of the present specification. In some examples, the example environment 100 enables entities to participate in a private blockchain network 102. The example environment 100 includes computing systems 106, 108, and a network 110. In some examples, the network 110 includes a local area network (LAN), a wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the private blockchain network 102. Example computing devices include, without limitation, a server, a desktop computer, a laptop computer, a tablet computing device, and a smartphone. In some examples, the computing systems 106, 108 hosts one or more computer-implemented services for interacting with the private blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the private blockchain network 102 is represented as a peer-to-peer network of nodes, and the computing systems 106, 108 provide nodes of the first entity and the second entity, respectively, which participate in the private blockchain network 102.

Figure 2:
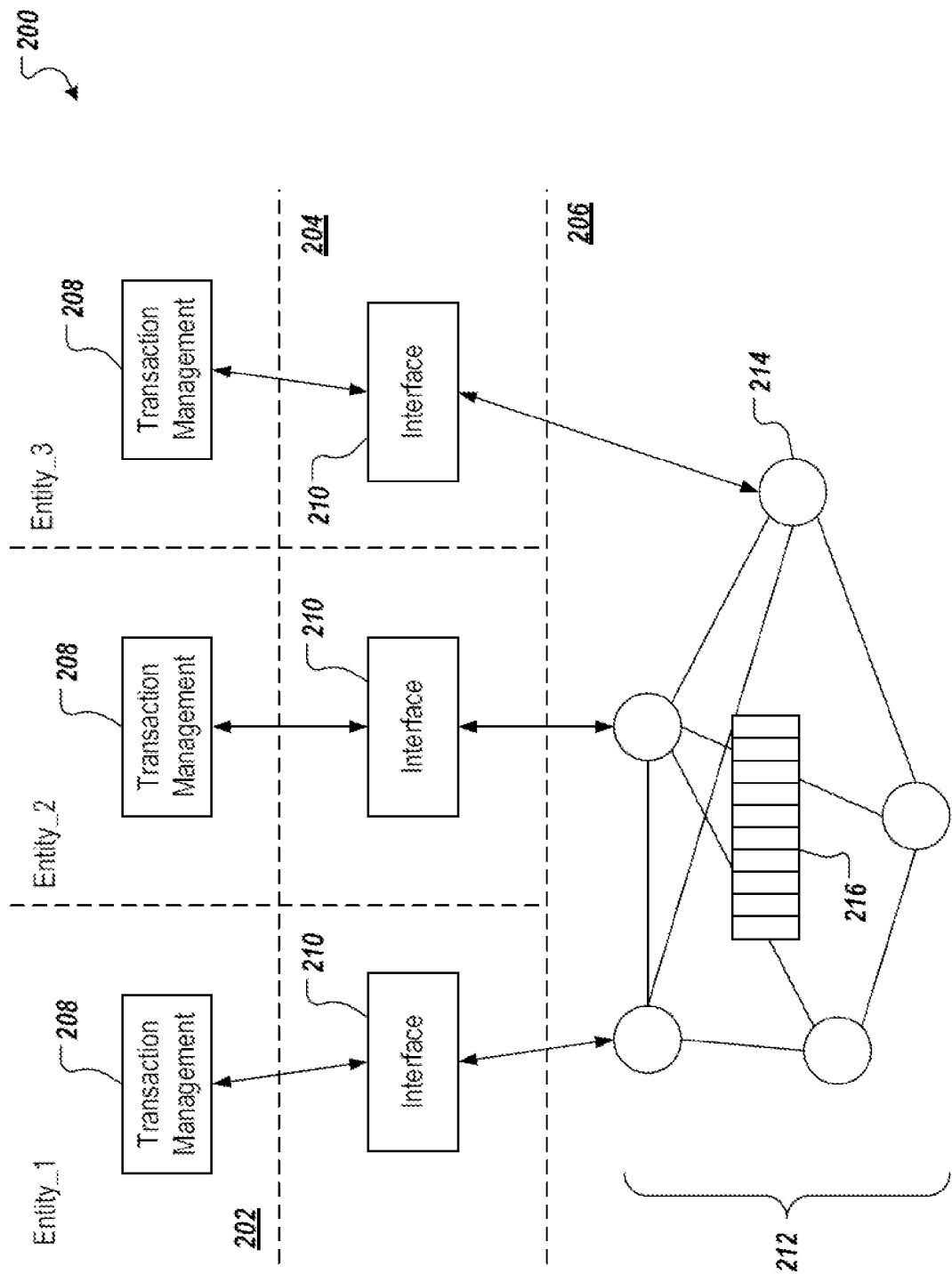
FIG. 2 depicts an example conceptual architecture in accordance with implementations of the present specification.

FIG. 2 depicts an example conceptual architecture 200 in accordance with implementations of the present specification. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicates with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the private blockchain network.

Figure 3:
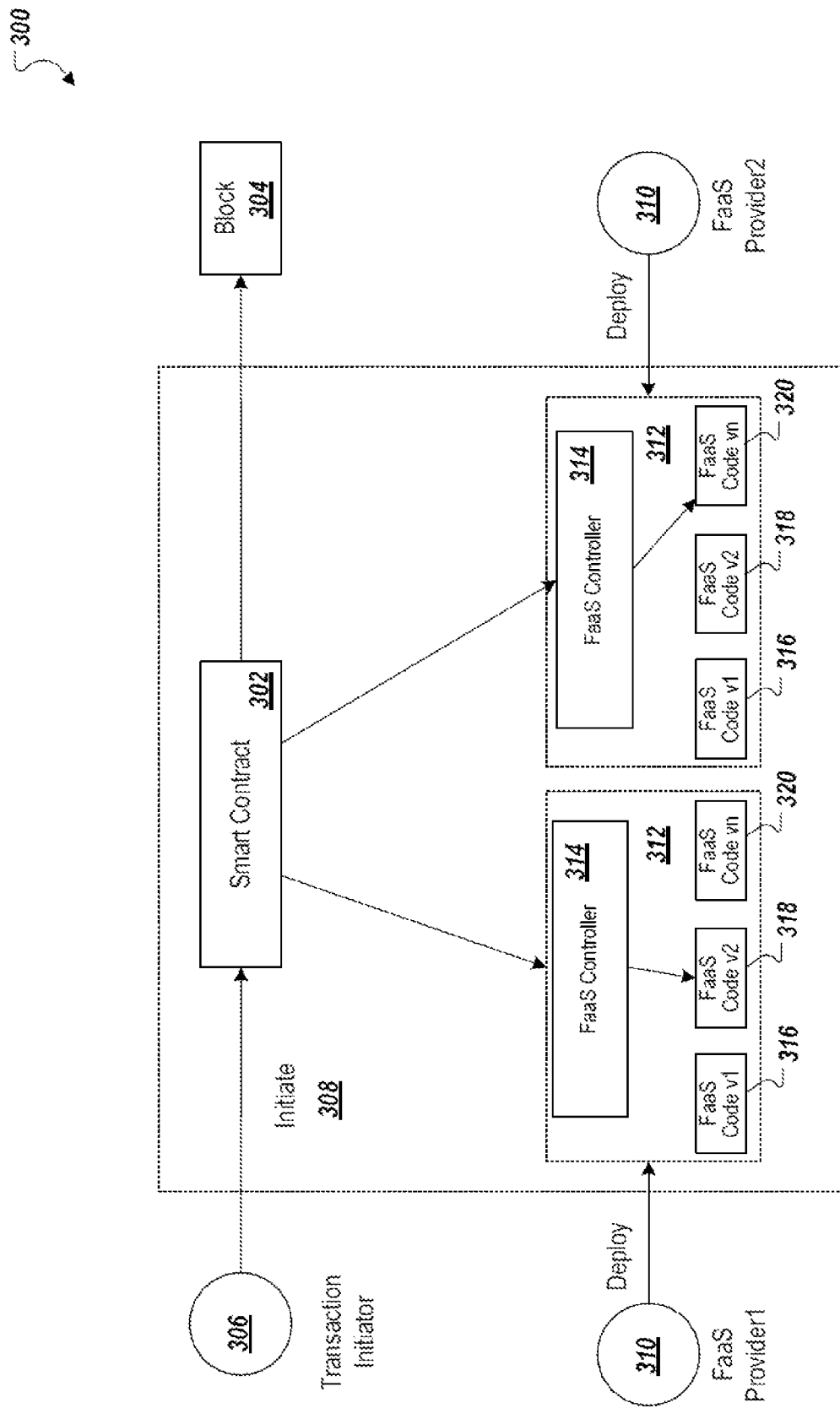
FIG. 3 depicts an example conceptual architecture for a function-as-a-service (FaaS) platform in accordance with implementations of the present specification.

FIG. 3 depicts an example conceptual architecture for a FaaS platform 300 in accordance with implementations of the present specification. As described in further detail herein, the FaaS platform 300 is used to provision functions that support execution of smart contracts, such as a smart contract 302 of FIG. 3. In some examples, the smart contract 302 can execute transactions that are recorded in blocks 304 of a blockchain.

In the example of FIG. 3, the FaaS platform 300 includes a transaction initiator 306 that can be, for example, a node that initiates an action prompting execution of the smart contract 302. For example, the transaction initiator 306 can send a request 308 to instigate execution of the smart contract 302. In some examples, the smart contract 302 receives the request, and executes logic programmed into the smart contract 302. In accordance with implementations of the present specification, the logic can include a call to one or more function applications 312 of the FaaS platform 300.

In some examples, each of the function applications 312 is provided by a respective function provider 310. For example, a function provider 310 can include an entity (e.g., developer) that develops a function application to receive input, execute a function, and provide output. In some examples, each function application 312 includes a function controller 314, and one or more functions 316, 318, 320 (function code). The function provider 310 can provide an initial version of a function (e.g., function 316), and can update the function to provide subsequent versions (e.g., functions 318, 320).

In some implementations, the smart contract 302 executes to a point that it calls a function. The smart contract 302 sends a function call to a respective function application 312, which includes input to be processed by the function application 312. The function call is received by the respective function controller 314. The function controller 314 routes the input to an appropriate version of the function 316, 318, 320. The function 316, 318, 320 that receives the input processes the input to provide output, which is sent back to the smart contract 302.

In some implementations, function applications that are provided by the FaaS platform 300 are stored in the blockchain, and are registered with the FaaS platform 300. In some examples, registration exposes information of the functions to users (e.g., developers of smart contracts). Example information can include, without limitation, an identifier of the provider 310, a description of the function, versions of the function, and statistics of the function (e.g., a number of times each version has been called). Users can use the information, for example, as an indication of a confidence level associated with each function. For example, a user developing a smart contract can review the registry to identify a function that is needed, and can program the smart contract to call the function.

The following is a non-limiting example to illustrate the design and use of the FaaS platform in accordance with implementations of the present specification. One or more function providers, also referred to as FaaS providers (e.g., the function providers 310 of FIG. 3), provide one or more computer-executable functions. For example, a function provider can develop computer-executable code for executing a function, the function receiving input, processing the input, and providing output. An example function can include, without limitation, a Rivest-Shamir-Adleman (RSA) checksum function, which receives, as input, a message of arbitrary length and produces a checksum as output (e.g., a 128-bit (16 octet) checksum). In some examples, the function is a pure function. That is, the function is without state information, repeatable calls, and/or nested calls.

In some implementations, a function controller (also referred to as a FaaS controller) is provided for the function (e.g., the function controller 314 of FIG. 3). In some examples, the function controller, and the function together form a function application, also referred to as a FaaS application (e.g., the function application 312 of FIG. 3). In some examples, the function controller handles statistics and storage for versions of the function, as well as calling information. Table 1, below, depicts example information stored by a function controller:

TABLE 1

Example Information

| Name | Variable Type | Meaning |
| --- | --- | --- |
| Latest Version | String latestVersion | The latest version of the function code version and the address (e.g., 23d61f4a88f90be1290c0eeab344992 e1a2e8f6d,1.0.0), where 1.0.0 is the version. |
| Version Mapping | Map<String, String> versionMap | Key is the smart contract address and Value is the version of the function code address. When there is a key-to-value key-value pair, the smart contract call from the key uses the indicated version of the function code, otherwise the default version calls the latest version. |
| Calling a Statistical Map | Map<String, Integer> statistics | Key is the version, Value is the number of calls, and each call is triggered by one. |

In some implementations, when a function is ready for production use, the function provider submits the function (as computer-executable function code) to the blockchain network, and the function code is assigned a unique address within the blockchain network (e.g., 23d61f4a88f90be1290c0eeab344992e1a2e8f6d). In some examples, the function controller is also submitted to the blockchain network, and is assigned its own unique address within the blockchain network. In some examples, when a function is first submitted to the blockchain network, the latest version value (e.g., latestVersion) is set to a default (e.g., 1.0.0). In some examples, the function is recorded in the version map based on the address and version value (e.g., 23d61f4a88f90be1290c0eeab344992e1a2e8f6d, 1.0.0), and statistics for the function are empty.

In some implementations, one or more smart contracts (e.g., the smart contract 302) can be created that call one or more functions of the FaaS platform. In some examples, a user creating a smart contract can view a library of available functions with relevant function information (e.g., description, address, version, statistics), and can program the smart contract to call one or more functions. For example, the smart contract can include logic that calls the example RSA checksum function introduced above. In some examples, the smart contract can include a version identifier indicating a version (e.g., 1.0.0) of the function that is to be called. In some examples, the version identifier can be empty (or null), which indicates that the latest version of the function is to be called. In some implementations, after the smart contract is complete and ready for use, the smart contract is submitted to the blockchain network, and the smart contract is assigned a unique address within the blockchain network (e.g., 39a150944018c549dfd6e 995def14b1ce3c98e5d).

In some implementations, to prevent the impact of an eventual upgrade (update) to the function code from impacting execution logic of the smart contract, the version map (versionMap) of the function controller is updated. Continuing with the non-limiting example above, the version map of the function application for the RSA checksum function is updated to:

{
"39a1509440f8c549dfd6e995def14b1ce3c98e5d":
    "23d61f4a88f90be1290c0eeab344992e1a2e8f6d,
    1.0.0"
}

This indicates that the example smart contract uses the first version of the example RSA checksum function. That is, the first version of the function is to always be used when the particular smart contract calls for the function.

Figure 4:
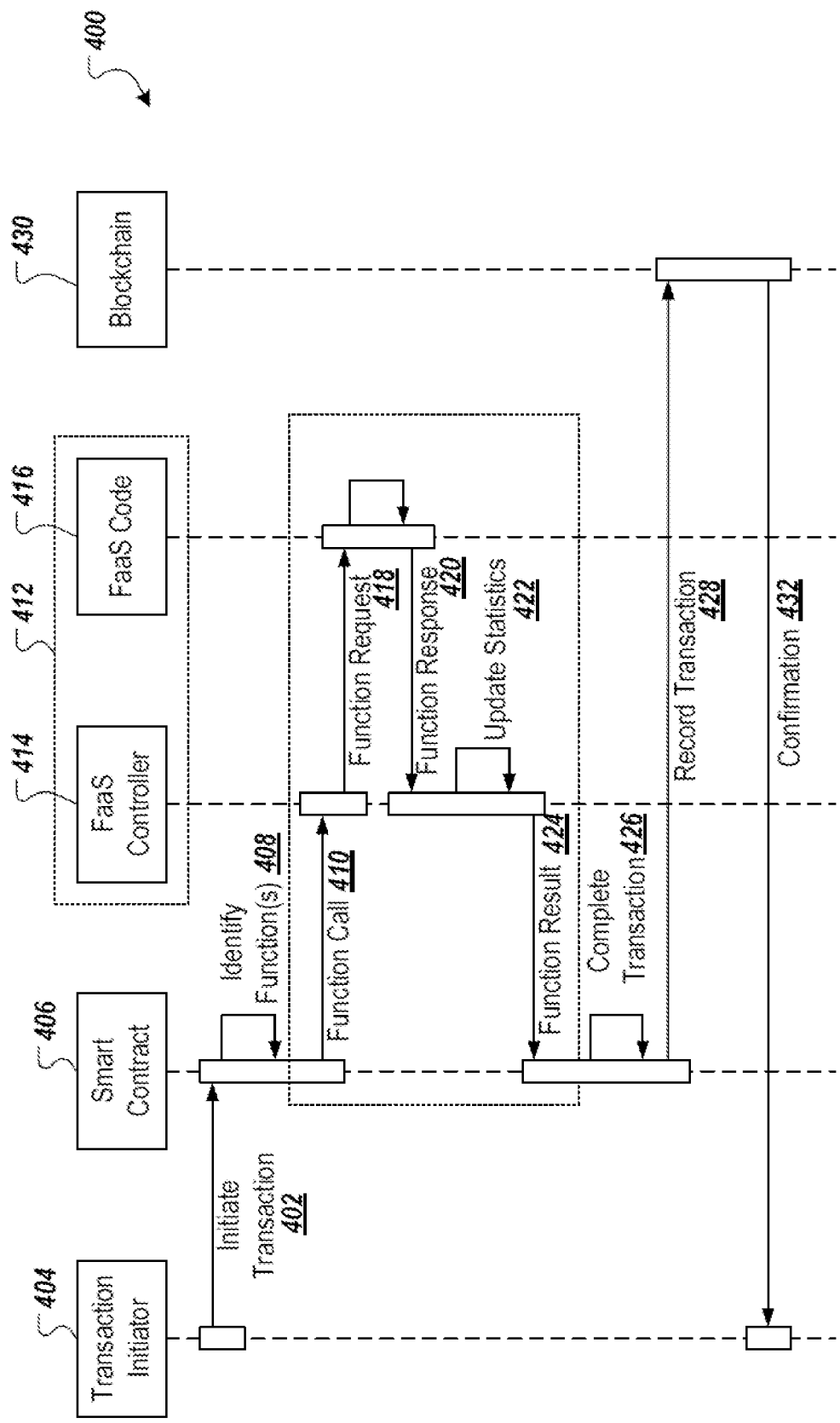
FIG. 4 depicts a swim lane diagram showing communication between components in accordance with implementations of the present specification.

FIG. 4 depicts a swim lane diagram 400 showing communication between components in accordance with implementations of the present specification. In accordance with implementations of the present specification, a transaction using the smart contract is initiated (402). For example, a node in the blockchain network (e.g., automatically, or prompted by a user serving as a transaction initiator 404) can initiate a transaction using the smart contract (e.g., smart contract 406). The smart contract can identify (408) the functions that are needed to complete the transaction. In some examples, during execution of the logic of the smart contract, one or more function calls can be made (410) to one or more FaaS applications 412. Each FaaS application 412 includes a FaaS controller 414 and a FaaS code 416. A FaaS application 412 can exist for each provider.

With continued reference to the above example, the smart contract can transmit a function call 410 for a RSA checksum value. In some examples, the function call is received by the function controller 414 for execution by FaaS code 416. In some examples, the function call includes input to the function, and a version variable, which indicates a version of the function that is to be executed. In some examples, the function call does not specify the version that is to be executed (e.g., the version value is null), in which case the latest version of the function is used.

The function controller processes the input (e.g., a message) to provide an output (e.g., a checksum value). A function request 418 is made of the FaaS code 416. As noted above, in a function response 420, either a specified version of the function, or the latest versions of the function is executed. Further, the call statistics map count value corresponding to the executed version of the function is updated 422 (e.g. incremented). Continuing with the example above, after first being called, the statistics content for the example RSA checksum function can be provided as:

{
"23d61f4a88f90be1290c0eeab344992e1a2e8f6d,1.0.0":1
}

A function result 424 is provided to the smart contract, which can then complete (426) the transaction. The transaction can be recorded (428) by the block chain (e.g., blockchain 430). A confirmation 432 can be sent to the transaction initiator 404.

The sequence of steps 410-424 can be repeated for each function called by the smart contract 406. For example, the smart contract 406 can call two functions, from two different FaaS providers, and receive function results from each, which the smart contract 406 uses to complete the transaction.

In some implementations, the function provider can update a previously provided function. For example, the function provider can recode at least a portion of the function to improve execution efficiency (e.g., quicker, fewer computational resources). Consequently, a subsequent version of the function can be provided. Continuing with the example above, a second version of the RSA checksum function can be provided, and submitted to the blockchain network. The second version of the function is assigned a unique address within the blockchain network (e.g., 2aae6a1150787a834382d0202ef1e89e3bc89d4d). The latest version value (latestVersion) within the function controller is updated to include the address of the updated function, and a version identifier (e.g., 2aae6a1150787a834382d0202ef1e89e3bc89d4d.2.0.0).

Another transaction (second transaction) using the smart contract is initiated. For example, and with continued reference to the above example, the smart contract can transmit a function call for a RSA checksum value. In some examples, the function call is received by the function controller. In some examples, the function call includes input to the function, and a version variable, which indicates a version of the function that is to be executed.

In some implementations, the function controller recognizes that the same smart contract (e.g., 39a1509440c549dfd6e995def14b1ce3c98e5d) has issued the function call. Consequently, although another version (e.g., 2.0.0) of the function is available, the last-used version (e.g., 1.0.0) of the function is used. The function processes the input (e.g., a message) to provide an output (e.g., a checksum value), and the call statistics map count value corresponding to the executed version of the function is incremented. Continuing with the example above, after the second time being called, the statistics content for the example RSA checksum function can be provided as:

{
"23d61f4a88f90be1290c0eeab344992e1a2e8f6d,1.0.0":2
}

In some implementations, it can be determined that the smart contract can use other versions of a function. For example, the user that originated the smart contract, and had indicated that a particular version (e.g., 1.0.0) was to be used, can determine that a subsequent version (e.g., 2.0.0) of the smart contract is satisfactory. Consequently, the user can update the version identifier within the version map (e.g., specify a different version, or set the version identifier to null). In a non-limiting example, the version identifier is set to null. In this manner, the next time the smart contract makes a function call, the latest version of the function will be used.

Another transaction (third transaction) using the smart contract is initiated. For example, and with continued reference to the above example, the smart contract can transmit a function call for a RSA checksum value. In some examples, the function call is received by the function controller. In some examples, the function call includes input to the function, and a version variable, which indicates a version of the function that is to be executed.

In some implementations, the function controller recognizes that the same smart contract (e.g., 39a1509440f8c549dfd6e995def14b1ce3c98e5d) has issued the function call, but that the version identifier is null. Consequently, although the first version (e.g., 1.0.0) of the function had been previously used, the last-used version (e.g., 2.0.0) of the function is used. The function processes the input (e.g., a message) to provide an output (e.g., a checksum value), and the call statistics map count value corresponding to the executed version of the function is incremented. Continuing with the example above, the statistics content for the example RSA checksum function can be provided as:

{
"23d61f4a88f90be1290c0eeab344992e1a2e8f6d,1.0.0":2
"2aae6a1150787a834382d0202ef1e89e3bc89d4d.2.0.0":1
}

Figure 5:
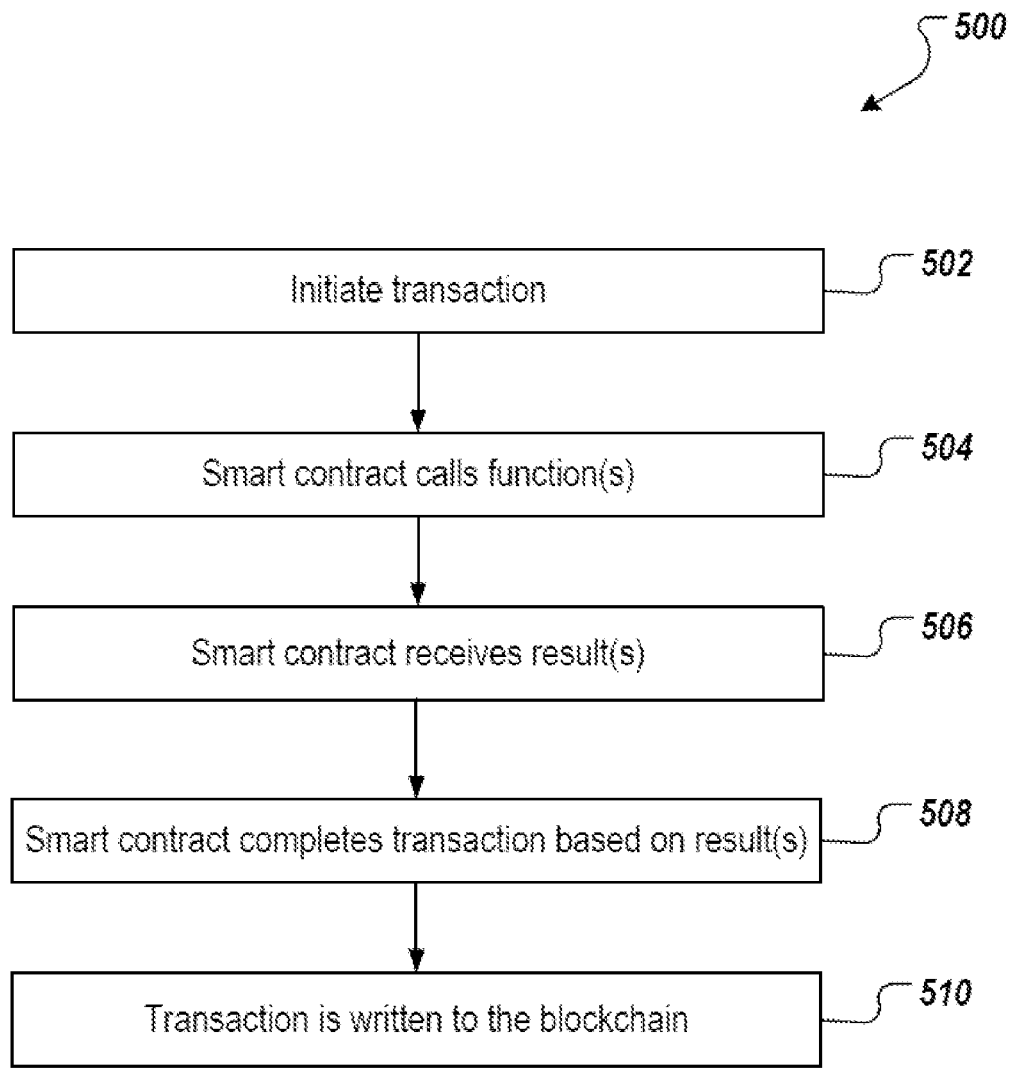
FIG. 5 depicts an example process that can be executed in accordance with implementations of the present specification.

FIG. 5 depicts an example process 500 that can be executed in accordance with implementations of the present specification. In some implementations, the example process 500 may be performed using one or more computer-executable programs executed using one or more computing devices.

At 502, a transaction is initiated. For example, the transaction can use a smart contract that is part of a blockchain network. The transaction can be initiated automatically, or the transaction can be prompted by a user. The transaction can be, for example, a transaction that a user is using to generate a random number for use in the smart contract.

At 504, a function is called by the smart contract. As an example, the function call 410 can be made, such as to call a random number generator function that is provided by the FaaS platform. In some implementations, the function call further can include an address of the function and a version identifier of the function. For example, the smart contract 406 can include, in the function call 410, the address within the blockchain that is associated with the function and a version number that identifies a specific version of the function to be called.

At 506, the smart contract receives result(s). For example, the 412 can provide the function result 424, such as a random number determined by the random number function. At 508, the smart contract completes transaction based on result(s). As an example, after the random number is received, the smart contract 406 can complete the random number operation that was requested by the user. At 510, a transaction is written to the blockchain. For example, the transaction 428 can be recorded, updating statistics that indicate that the random number function has been used another time.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present specification have been described. Nevertheless, it will be understood that various modifications may be made without departing from the spirit and scope of the present specification. Accordingly, other implementations are within the scope of the following claims.

What is claimed is:

1. A computer-implemented method providing a function-as-a-service (FaaS) platform within a blockchain network, the computer-implemented method being executed by one or more processors, the computer-implemented method comprising:
    initiating, by a first blockchain node in the blockchain network, a request to execute a transaction using a smart contract associated with the first or a second blockchain node in the blockchain network;
    receiving, by the smart contract, the request to execute the transaction;
    determining, by the smart contract, a first function of the transaction to be executed;
    receiving, from the smart contract, and by a first function controller executing within the blockchain network, a first function call to execute the first function of the transaction, wherein the first function call comprises data of the first function call for execution;
    transmitting, by the first function controller, the data of the first function call for execution to a first function component;
    executing, by the first function component, the first function of the transaction based on the data of the first function call for execution;
    receiving, by the first function controller, a first function execution result from the first function component; and
    providing, by the first function controller, the first function execution result to the smart contract prior to execution, by the smart contract, of the transaction at least partially based on the first function execution result.

2. The computer-implemented method of claim 1, wherein the first function call further comprises an address of the first function of the transaction and a version identifier of the first function of the transaction.

3. The computer-implemented method of claim 2, wherein the version identifier of the first function of the transaction is null indicating that a latest version of the first function of the transaction is to be executed.

4. The computer-implemented method of claim 1, further comprising updating, by the first function controller, statistics associated with a version of the first function of the transaction that was executed in response to the first function call.

5. The computer-implemented method of claim 4, wherein the statistics indicate a number of times each version of the first function of the transaction has been executed.

6. The computer-implemented method of claim 1, further comprising:

receiving, from the smart contract, and by a second function controller executing within the blockchain network, a second function call to execute a second function of the transaction, wherein the second function call comprises data of the second function call for execution, wherein the second function of the transaction is different from the first function of the transaction, and wherein the second function controller is different from the first function controller;

transmitting, by the second function controller, the data of the second function call for execution to a second function component, wherein the second function component is different from the first function component;

executing, by the second function component, the second function of the transaction based on the data of the second function call for execution;

receiving, by the second function controller, a second function execution result from the second function component; and providing, by the second function controller, the second function execution result to the smart contract prior to execution, by the smart contract, of the transaction at least partially based on the second function execution result.

7. The computer-implemented method of claim 6, wherein the first function of the transaction and the second function of the transaction are provided by different providers.

8. One or more non-transitory computer-readable storage media encoded with instructions executed by one or more computers that cause the one or more computers to perform operations providing a function-as-a-service (FaaS) platform within a blockchain network, the operations comprising:

initiating, by a first blockchain node in the blockchain network, a request to execute a transaction using a smart contract associated with the first or a second blockchain node in the blockchain network;

receiving, by the smart contract, the request to execute the transaction;

determining, by the smart contract, a first function of the transaction to be executed;

receiving, from the smart contract, and by a first function controller executing within the blockchain network, a first function call to execute the first function of the transaction, wherein the first function call comprises data of the first function call for execution;

transmitting, by the first function controller, the data of the first function call for execution to a first function component;

executing, by the first function component, the first function of the transaction based on the data of the first function call for execution;

receiving, by the first function controller, a first function execution result from the first function component; and providing, by the first function controller, the first function execution result to the smart contract prior to execution, by the smart contract, of the transaction at least partially based on the first function execution result.

9. The one or more non-transitory computer-readable storage media of claim 8, wherein the first function call further comprises an address of the first function of the transaction and a version identifier of the first function of the transaction.

10. The one or more non-transitory computer-readable storage media of claim 9, wherein the version identifier of the first function of the transaction is null indicating that a latest version of the first function of the transaction is to be executed.

11. The one or more non-transitory computer-readable storage media of claim 8, wherein the operations further comprise updating, by the first function controller, statistics associated with a version of the first function of the transaction that was executed in response to the first function call.

12. The one or more non-transitory computer-readable storage media of claim 11, wherein the statistics indicate a number of times each version of the first function of the transaction has been executed.

13. The one or more non-transitory computer-readable storage media of claim 8, wherein the operations further comprise:

receiving, from the smart contract, and by a second function controller executing within the blockchain network, a second function call to execute a second function of the transaction, wherein the second function call comprises data of the second function call for execution, wherein the second function of the transaction is different from the first function of the transaction, and wherein the second function controller is different from the first function controller;

transmitting, by the second function controller, the data of the second function call for execution to a second function component, wherein the second function component is different from the first function component;

executing, by the second function component, the second function of the transaction based on the data of the second function call for execution;

receiving, by the second function controller, a second function execution result from the second function component; and providing, by the second function controller, the second function execution result to the smart contract prior to execution, by the smart contract, of the transaction at least partially based on the second function execution result.

14. The one or more non-transitory computer-readable storage media of claim 13, wherein the first function of the transaction and the second function of the transaction are provided by different providers.

15. A system, comprising:
one or more computers; and
one or more memories coupled to the one or more computers and stored with instructions executed by the one or more computers to perform operations providing a function-as-a-service (FaaS) platform within a blockchain network, the operations comprising:

initiating, by a first blockchain node in the blockchain network, a request to execute a transaction using a smart contract associated with the first or a second blockchain node in the blockchain network;

receiving, by the smart contract, the request to execute the transaction;

determining, by the smart contract, a first function of the transaction to be executed;

receiving, from the smart contract, and by a first function controller executing within the blockchain network, a first function call to execute the first function of the transaction, wherein the first function call comprises data of the first function call for execution;

transmitting, by the first function controller, the data of the first function call for execution to a first function component;

executing, by the first function component, the first function of the transaction based on the data of the first function call for execution;

receiving, by the first function controller, a first function execution result from the first function component; and providing, by the first function controller, the first function execution result to the smart contract prior to execution, by the smart contract, of the transaction at least partially based on the first function execution result.

16. The system of claim 15, wherein the first function call further comprises an address of the first function of the transaction and a version identifier of the first function of the transaction.

17. The system of claim 16, wherein the version identifier of the first function of the transaction is null indicating that a latest version of the first function of the transaction is to be executed.

18. The system of claim 15, wherein the operations further comprise updating, by the first function controller, statistics associated with a version of the first function of the transaction that was executed in response to the first function call.

19. The system of claim 18, wherein the statistics indicate a number of times each version of the first function of the transaction has been executed.

20. The system of claim 15, wherein the operations further comprise:

receiving, from the smart contract, and by a second function controller executing within the blockchain network, a second function call to execute a second function of the transaction, wherein the second function call comprises data of the second function call for execution, wherein the second function of the transaction is different from the first function of the transaction, and wherein the second function controller is different from the first function controller;

transmitting, by the second function controller, the data of the second function call for execution to a second function component, wherein the second function component is different from the first function component;

executing, by the second function component, the second function of the transaction based on the data of the second function call for execution;

receiving, by the second function controller, a second function execution result from the second function component; and providing, by the second function controller, the second function execution result to the smart contract prior to execution, by the smart contract, of the transaction at least partially based on the second function execution result.

21. The system of claim 20, wherein the first function of the transaction and the second function of the transaction are provided by different providers.

* * * * *

UNITED STATES PATENT AND TRADEMARK OFFICE
CERTIFICATE OF CORRECTION

| | | |
|---|---|---|
| PATENT NO. | : 10,824,419 B2 | Page 1 of 1 |
| APPLICATION NO. | : 16/834559 | |
| DATED | : November 3, 2020 | |
| INVENTOR(S) | : Kailai Shao and Xuming Lu | |

It is certified that error appears in the above-identified patent and that said Letters Patent is hereby corrected as shown below:

In the Specification

Column 1/Lines 13-17 - Below "in its entirety." delete "This application is a continuation of U.S. patent application Ser. No. 16/390,088, filed on Apr. 22, 2019, which is a continuation of PCT Application No. PCT/CN2018/117637, filed on Nov. 27, 2018, each application is hereby incorporated by reference in its entirety.".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*